US012187497B2

(12) United States Patent
Bisio

(10) Patent No.: US 12,187,497 B2
(45) Date of Patent: Jan. 7, 2025

(54) PLASTIC CLOSURE DEVICE FOR A CONTAINER FOR PARENTERAL PHARMACEUTICAL PRODUCTS

(71) Applicant: BISIO PROGETTI S.P.A., Alessandria (IT)

(72) Inventor: Stefano Bisio, Alessandria (IT)

(73) Assignee: BISIO PROGETTI S.P.A., Alessandria (IT)

( * ) Notice: Subject to any disclaimer, the term of this patent is extended or adjusted under 35 U.S.C. 154(b) by 0 days.

(21) Appl. No.: 18/269,834

(22) PCT Filed: Jan. 18, 2022

(86) PCT No.: PCT/IB2022/050392
§ 371 (c)(1),
(2) Date: Jun. 27, 2023

(87) PCT Pub. No.: WO2022/172100
PCT Pub. Date: Aug. 18, 2022

(65) Prior Publication Data
US 2024/0067412 A1 Feb. 29, 2024

(30) Foreign Application Priority Data
Feb. 12, 2021 (IT) ........................ 102021000003182

(51) Int. Cl.
*B65D 41/28* (2006.01)
*A61J 1/14* (2023.01)
(Continued)

(52) U.S. Cl.
CPC ............ *B65D 41/62* (2013.01); *A61J 1/1425* (2015.05); *B65D 41/16* (2013.01); *B65D 41/28* (2013.01);
(Continued)

(58) Field of Classification Search
CPC ........ B65D 41/16; B65D 41/28; B65D 41/46; B65D 41/62; B65D 51/002; B65D 51/18; A61J 1/1425
(Continued)

(56) References Cited

U.S. PATENT DOCUMENTS 3,480,171 A 11/1969 Rohde
3,603,472 A * 9/1971 Lecinski, Jr. .......... B65D 41/08 215/346
(Continued)

FOREIGN PATENT DOCUMENTS

| | | | |
|---|---|---|---|
| DE | 1092793 | B | 11/1960 |
| EP | 0656297 | A2 | 6/1995 |
| WO | 20170001459 | A1 | 1/2017 |
| WO | 20190007653 | A1 | 1/2019 |

OTHER PUBLICATIONS

International Search Report, issued in PCT/IB2022/050392, mailed Jun. 3, 2022, Rijswijk, NL.

*Primary Examiner* — Luan K Bui
(74) *Attorney, Agent, or Firm* — ArentFox Schiff LLP; Michael Fainberg

(57) ABSTRACT

A plastic closure device for a container for parenteral pharmaceutical products having a bottle provided with a neck is provided. The plastic closure device has an outer cap with tearable weakenings to allow tear-off removal of the outer cap and an inner cage provided with a head having a central opening. A skirt ending in a lower edge extends below the central opening. Retaining elements for permanent snap engagement on the neck of the bottle are provided at the lower edge. The outer cap is snap-engaged under the lower edge of the inner cage by coupling elements. The plastic closure device guarantees authenticity of the container and its tightness even in the event of tampering attempts.

19 Claims, 14 Drawing Sheets

(51) Int. Cl.

| | |
|---|---|
| ***B65D 41/16*** | (2006.01) |
| ***B65D 41/46*** | (2006.01) |
| ***B65D 41/62*** | (2006.01) |
| ***B65D 51/00*** | (2006.01) |
| ***B65D 51/18*** | (2006.01) |

(52) U.S. Cl.
CPC ........... *B65D 41/46* (2013.01); *B65D 51/002* (2013.01); *B65D 51/18* (2013.01)

(58) Field of Classification Search
USPC ........ 206/438, 528, 540; 215/204, 228, 247, 215/251, 253
See application file for complete search history.

(56) References Cited

U.S. PATENT DOCUMENTS

| | | | | |
|---|---|---|---|---|
| 4,251,003 | A | 2/1981 | Bodenmann | |
| 5,314,084 | A * | 5/1994 | Folta | B65D 51/241 215/350 |
| 8,714,384 | B2 * | 5/2014 | Aneas | A61J 1/1412 215/247 |
| 8,839,971 | B2 * | 9/2014 | Aneas | B65D 51/241 215/350 |
| 12,071,279 | B2 * | 8/2024 | Koutal | B65D 51/241 |
| 2016/0184182 | A1 | 6/2016 | Gross et al. | |
| 2023/0414451 | A1 * | 12/2023 | Yoshida | A61J 1/1425 |
| 2024/0051719 | A1 * | 2/2024 | Cavusoglu Ataman | A61J 1/1412 |

* cited by examiner

PLASTIC CLOSURE DEVICE FOR A CONTAINER FOR PARENTERAL PHARMACEUTICAL PRODUCTS

CROSS-REFERENCE TO RELATED APPLICATIONS

This application is a National Phase Application of PCT International Application No. PCT/IB2022/050392, having an International Filing Date of Jan. 18, 2022 which claims priority to Italian Application No. 102021000003182 filed Feb. 12, 2021, each of which is hereby incorporated by reference in its entirety.

FIELD OF THE INVENTION

The present invention relates in general to the field of closures of containers, generally in the form of vials or bottles, for pharmaceutical products, and in particular to the field of parenterally administrable drugs.

It is an object of this invention to provide a plastic closure device, partially removable by tearing, able to guarantee the authenticity of the container, highlighting any tampering thereof.

BACKGROUND OF THE INVENTION

Caps are known in the art for further sealing a container, generally a vial in the form of a glass bottle, which is already sealed by a rubber closure. In such known solutions, the cap entirely covers the rubber closure.

In the case of orally administrable drugs, which therefore require intestinal absorption, the cap is completely removed to allow the removal of the rubber closure and therefore access to the container.

An example of said known solutions for orally administrable drugs is described in prior art document U.S. Pat. No. 3,480,171 (A), directed to a cap entirely made of metal, specifically made of aluminum. One of the advantages of aluminum lies in the deformability of the material which allows the cap to be easily fixed in position by folding a lower end thereof under the edge of the container neck. Furthermore, a cap entirely made of metal allows very reduced thickness and dimensions to be maintained. However, the metal cap has a number of disadvantages, linked precisely to the material. A thin metal cap may in fact deform undesirably during the filling and cleaning steps of the containers. A further drawback lies in the fact that minute metal particles may detach during the tear-open step and come into contact with the rubber closure, contaminating it. Moreover, this type of cap does not guarantee the authenticity and integrity of the contents of the container. In fact, the fixing of the cap by folding the edge is easily tampered with using suitable tools.

Solutions of plastic caps for orally administrable drugs are known in the art. An example is described in U.S. Pat. No. 4,251,003 (A), in which the cap comprises a tear-off removable outer cap and an easily removable inner cage to allow subsequent removal of the rubber closure. In such solution, the outer cap is required to hold the inner cage firmly in place below the edge of the container neck. Although such a cap allows the problems related to the use of metal to be solved, it still has a major drawback. In fact, this type of cap does not guarantee the authenticity and integrity of the contents of the container, since the outer cap is easily tampered with using suitable tools.

In summary, in caps for orally administrable drugs it is essential that the cap is completely removed to allow the subsequent removal of the rubber closure. Furthermore, the caps known for this type of drug are easily tampered with by acting on the lower edge of the cap itself.

In caps for parenterally administrable drugs, it is essential that the rubber closure remains firmly pressed into the container neck. In the case of parenterally administrable drugs, in fact, only the upper portion of the cap may be opened, for example by tearing, to allow exposure of the upper part of the rubber closure intended to be pierced by the needle of a syringe, used to withdraw the pharmacological solution contained inside the container.

Solutions of plastic caps for parenterally administrable drugs are known in the art. Such an example is described in document US 2016/184182 (A1), in which the cap comprises an upper portion which may be opened to expose the pierceable area of the rubber closure, and a fixed lower portion to keep the rubber closure firmly in the sealing position. In this solution, the fixed portion is snap-engaged to the edge of the container neck and extends to cover the entire neck. While this solution reduces the risks of tampering, given that it is difficult to access under the cap to try to tamper with it, it still has some drawbacks. In fact, in the event of accidental blows at the lower edge or tampering attempts, there is in any case the risk that the fixed portion is released from the neck of the container, making the pressure force on the rubber closure disappear and compromising the hermetic closure thereof. Furthermore, the presence of a deliberately elongated fixed portion causes a problem of visibility of the container neck when, during the final withdrawal of the pharmacological solution by means of a syringe, the container is turned upside down and the residual solution collects right at the neck. Furthermore, this known cap does not have any adaptation mechanism for compensating different heights of the glass containers in the case of simultaneous filling, nor mechanisms for compensating the dimensional tolerances typical of glass and rubber components.

SUMMARY OF THE INVENTION

The object of the present invention is to provide a plastic closure device for parenterally administrable drugs, partially tear-off, which solves the problems of the prior art taking into account the needs of the field.

In particular, an object of this invention is to provide a plastic closure device for parenterally administrable drugs, partially removable by tearing, able to guarantee the authenticity of the container, highlighting any tampering thereof.

Another object of the invention is to provide a plastic safety cap capable of guaranteeing the authenticity of the container while allowing correct visibility of the neck of the container during the final withdrawal of the pharmacological solution by means of a syringe.

Another object of the invention is to provide a plastic safety cap which keeps the rubber element firmly sealingly fixed to the container even after the cap has been partially torn-off.

Another object of the invention is to provide a plastic safety cap which, even in the event of undesirable partial deformations during the filling and cleaning of the containers, still maintains the hermetic closure thereof.

Another object of the invention is to provide a plastic safety cap provided with at least one adaptation mechanism to compensate for different heights of the glass bottles in the case of simultaneous filling.

Another object of the invention is to provide a plastic safety cap provided with at least one mechanism for compensating the dimensional tolerances typical of glass and rubber components.

Another object of the invention is to provide a plastic safety cap consisting of only two components which are easy to manufacture by injection molding.

Such object is achieved by a partially tear-off plastic closure device and a container for parenterally administrable drugs, as described and claimed herein. Preferred embodiments of the invention are also described.

BRIEF DESCRIPTION OF THE FIGURES

The features and advantages of the closure device according to the present invention will appear more clearly from the following description, made by way of an indicative and non-limiting example with reference to the accompanying figures, in which.

DETAILED DESCRIPTION

Figure 2:
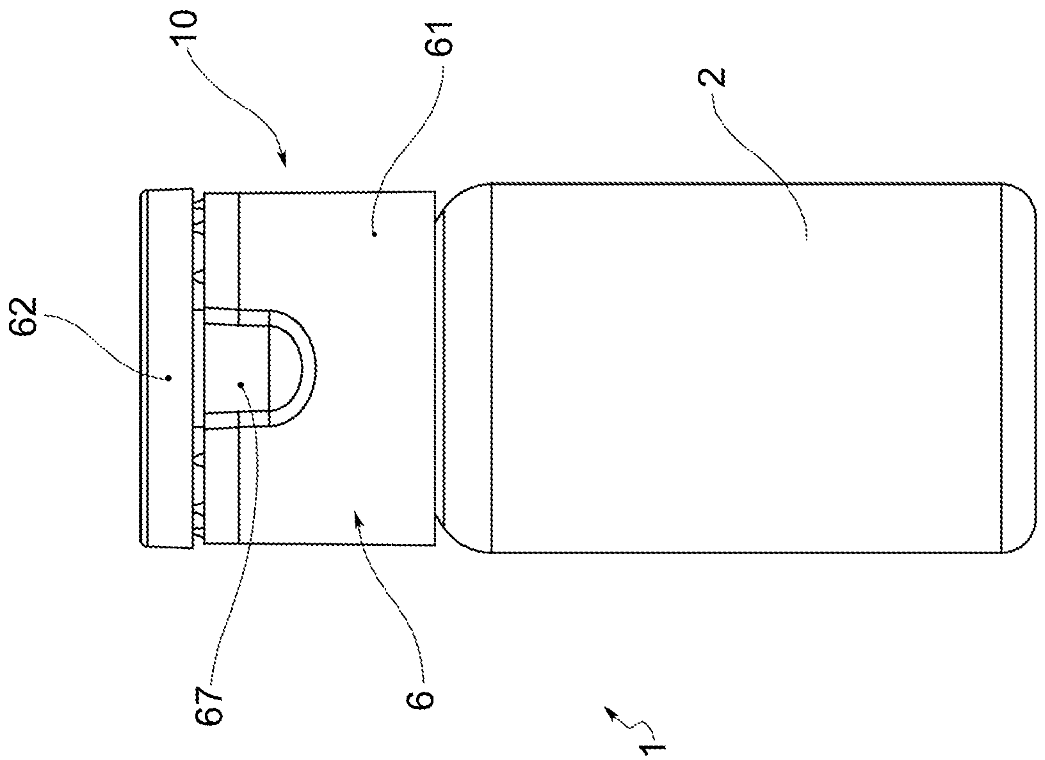
FIG. 2 shows a front view of a container for parenterally administrable drugs provided with a partially tear-off plastic closure device according to the present invention.

In the accompanying figures, the reference numeral 1 indicates a container for parenterally administrable pharmaceutical products comprising a bottle 2 closed by a closing device 10 made of a sealing element 3, for example made of rubber, and a safety cap 4, for example made of plastic, partially tear-off and adapted to guarantee the authenticity of the container, highlighting any tampering.

The safety cap 4 completely covers the sealing element 3 and may be removed at least partially in order to expose a pierceable portion 31 of such sealing element 3 intended to be pierced by the needle of a syringe in order to be able to withdraw the pharmacological solution S contained in the bottle 2.

Figure 5:
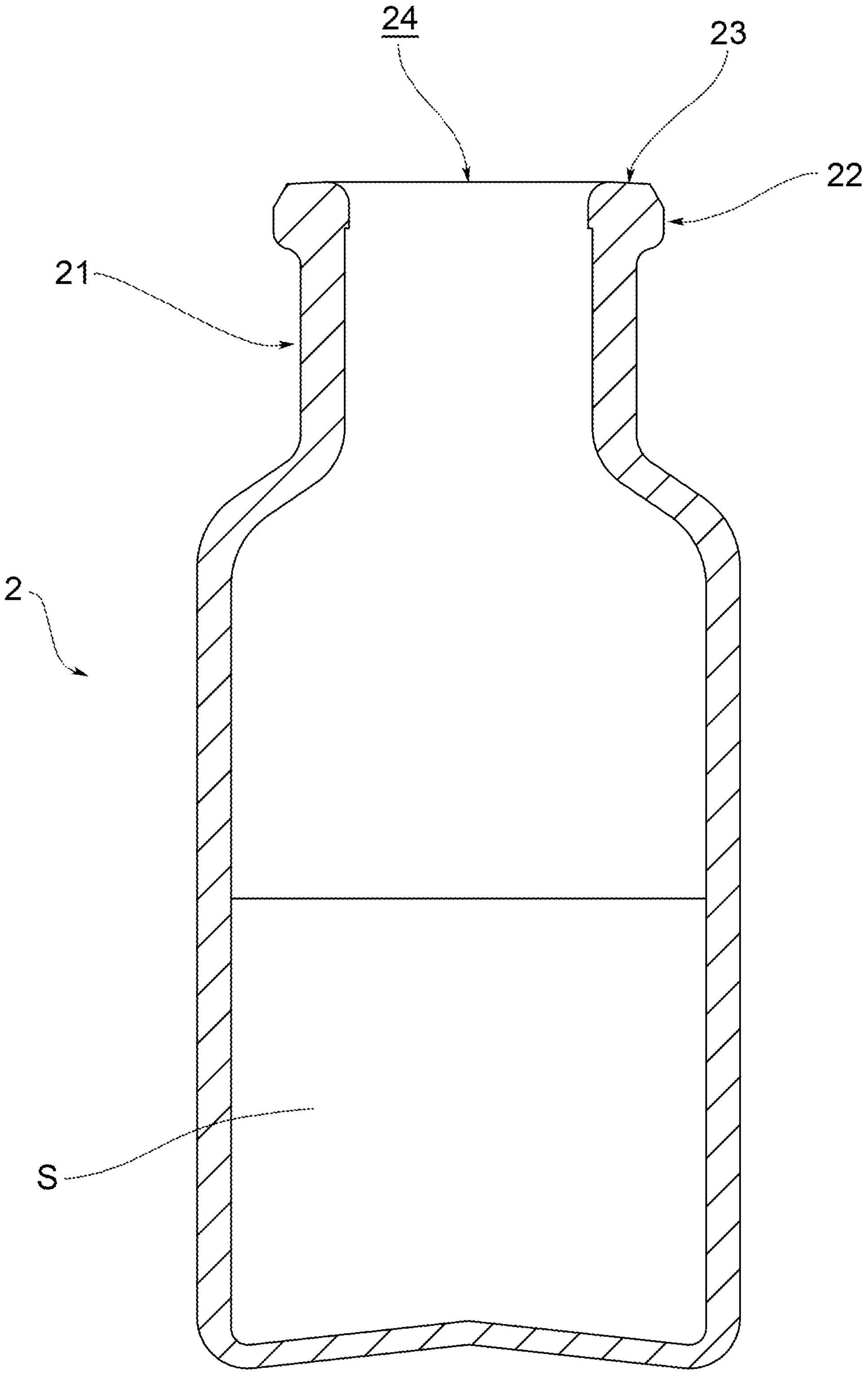
FIG. 5 shows a container for parenterally administrable drugs according to the present invention.

The bottle 2, shown in detail in FIG. 5, is intended to contain a parenterally administrable pharmacological solution S and is provided with a neck 21 ending superiorly in an edge 23 which defines the mouth 24 of the bottle itself. The edge 23 is provided with a ridge 22 protruding radially from the neck 21 and having an outer diameter greater than the outer diameter of the neck 21. The neck 21 of the bottle ends at the beginning of the shoulder of the bottle.

In the container 1, the mouth 24 of the bottle 2 is closed by a sealing element 3.

The sealing element 3, shown in detail in FIGS. 9A and 9B and described below, is a rubber cap which seals in a sterile manner the contents of the bottle 2 from the environment, and which may be pierced by a hypodermic needle, not shown in the drawings, to remove the pharmacological solution S from the container 1.

The sealing element 3 is covered by the safety cap 4 which, in addition to contributing to the sealing of the container 1, also has a "tamper evident" function, highlighting any tampering with the container itself.

The safety cap 4 comprises two elements and is made entirely of plastic. Preferably, the safety cap 4 consists of only two elements.

The safety cap 4 comprises:

- an inner cage 5, shown in detail in FIGS. 6A to 7C and described below, adapted to partially cover the sealing element 3 leaving at least one of its pierceable portion 31 exposed, and adapted to keep the sealing element 3 engaged inside the mouth 24 of the bottle 2 in the correct sealing position even when using the container 1,
- an outer cap 6, shown in detail in FIG. 12 and described below, adapted to completely cover the sealing element 3 and the inner cage 5 until the moment of use of the container 1, when said outer cap 6 may be removed by tearing to expose the pierceable portion 31 of the sealing element 3 intended to be pierced by the needle of a syringe to be able to withdraw the pharmacological solution S contained inside the bottle 2.

FIGS. 6A to 7C show the inner cage 5 of the safety cap 4 according to the present invention, in two possible embodiment variants.

The inner cage 5 comprises a head 51, provided with a central opening 52 which allows access to the pierceable portion 31 of the sealing element 3, below which a cylindrical skirt 53 extends, ending in a lower edge 54 at which retaining means 55 are provided.

The head 51 of the inner cage 5 is provided with an outer head surface 512 and an inner head surface 511.

The skirt 53 has a certain height, adapted to the dimensions of the ridge 22 of the bottle 2 and of the sealing element 3.

The skirt 53 of the inner cage 5 is provided with an outer skirt surface 532 and an inner skirt surface 531.

The skirt 53 ends in a lower edge 54 at which internally projecting retaining means 55 are provided. In fact, the inner cage 5 of the safety cap 4 snap-engages below the ridge 22 of the neck 21 of the bottle 2 by means of said retaining means 55.

The retaining means 55 are made in one piece with the skirt 53.

The retaining means 55 are at least one hook-shaped protrusion facing towards the inside of the inner cage 5, that is to say facing towards the inner surface of the skirt 531.

Preferably, the retaining means 55 are connected to the skirt 53 through the lower edge 54, which preferably has a curvilinear profile to further increase the flexibility of the retaining means 55.

The retaining means 55 are provided with a bearing space 551 defined between the retaining means itself and the inner surface of the skirt 531. As may be seen in FIGS. 8A and 8B, during the positioning of the inner cage 5 on the neck 21 of the bottle 2, the retaining means 55 compress, approaching the inner surface of the skirt 531 and occupying the bearing space 551, without deforming the inner cage 5. This solution facilitates the sliding of the retaining means 55 at the ridge 22 of the bottle 2, until the snap engagement underneath said ridge 22 is obtained. Advantageously, the high flexibility of the retaining means 55 reduces the fitting loads of the safety caps 4 on the bottles 2 in the case of simultaneous filling.

Figure 8B:
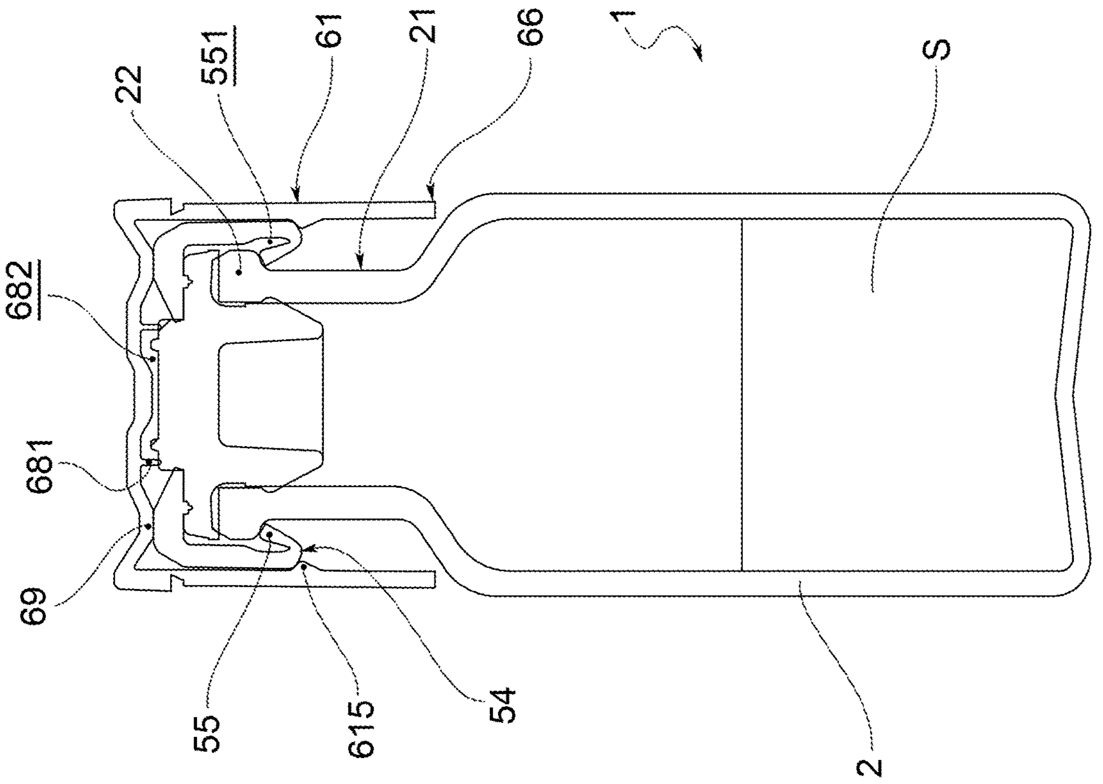
FIGS. 8A and 8B show the assembly steps of the closure device according to the present invention on the relative container.
Figure 8A:
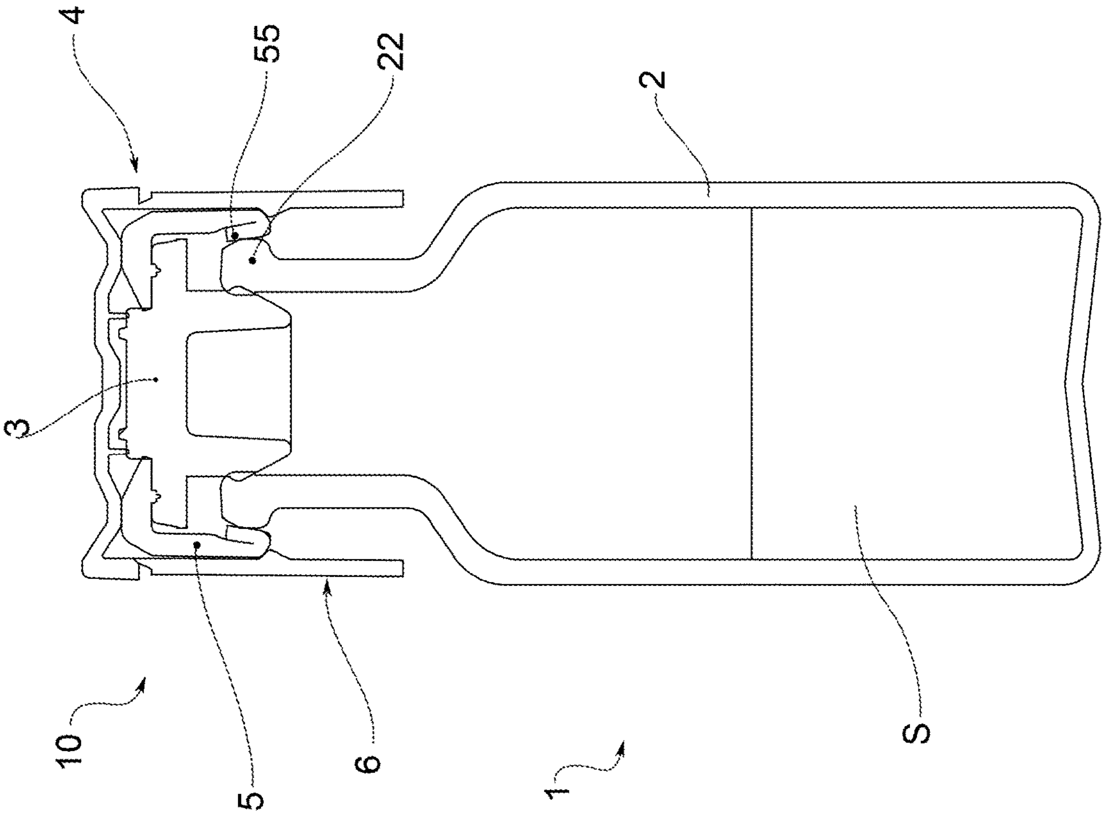

Therefore, the retaining means 55 are preferably hook-folded projections, capable of bending during assembly on the neck 21 of the bottle 2 (FIG. 8A), and of jamming under said neck 21 in case of removal attempts (FIG. 8B). This solution provides a low fitting force, by virtue of the bearing space 551, and a high removal force, by virtue of the folded hook shape. In summary, therefore, the inner cage 5 of the safety cap 4 is provided with highly flexible retaining means 55, to facilitate the assembly steps of the container 1, and with a high clamping force, to best retain the inner cage 5 on the neck 21 of the bottle 2. Advantageously, therefore, by virtue of the retaining means 55 of the inner cage 5, once the snap coupling on the neck 21 of the bottle 2 has been obtained, no further fixing or retaining element will be required to keep the sealing element 3 firmly in the closed sealing position of the mouth 24 of the bottle 2 even if the outer cap 6 is completely removed by tearing. Therefore, even in the event of attempts to tamper with the outer cap 6 and breakage of the relative band 61, the sealing element 3 remains firmly in the sealing position of the mouth 24 by means of the inner cage 5.

Figure 6A:
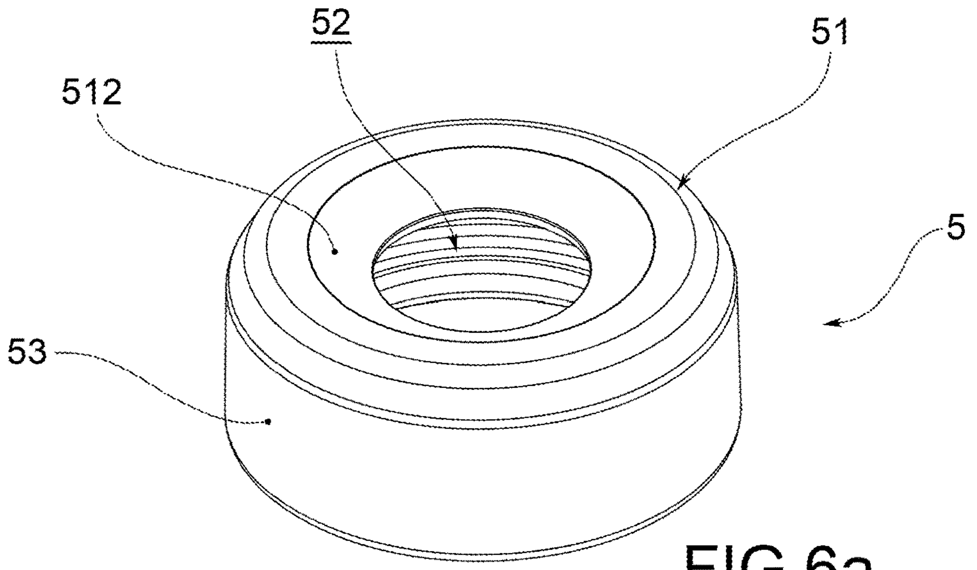
FIGS. 6A, 6B and 6C show an axonometric view from above, one from below and one in section, respectively, of a component of the closure device according to the present invention, in particular of an inner cage, in an embodiment example.
Figure 6B:
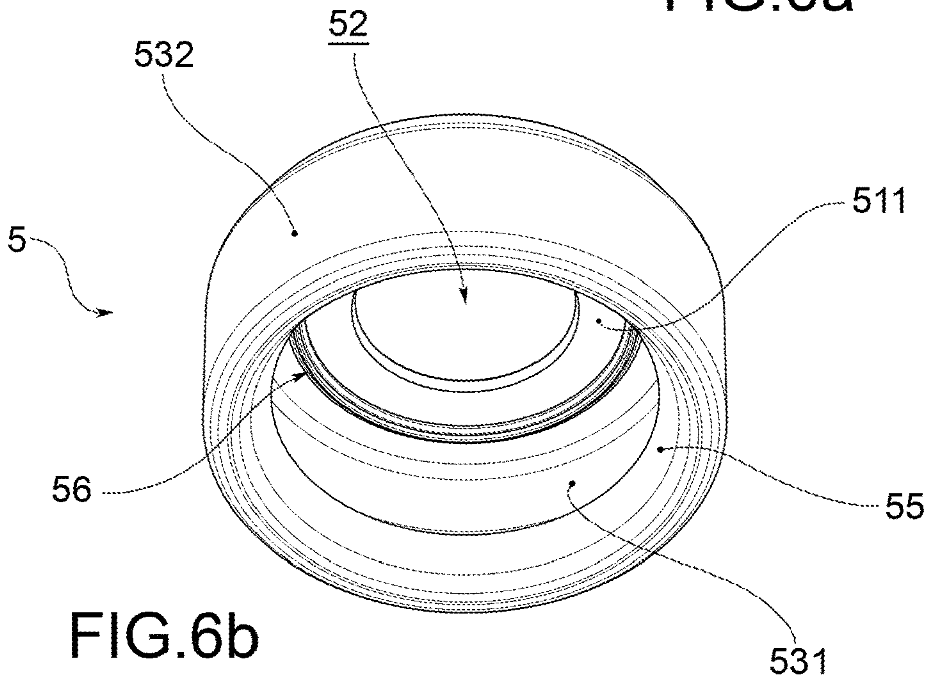
Figure 6C:
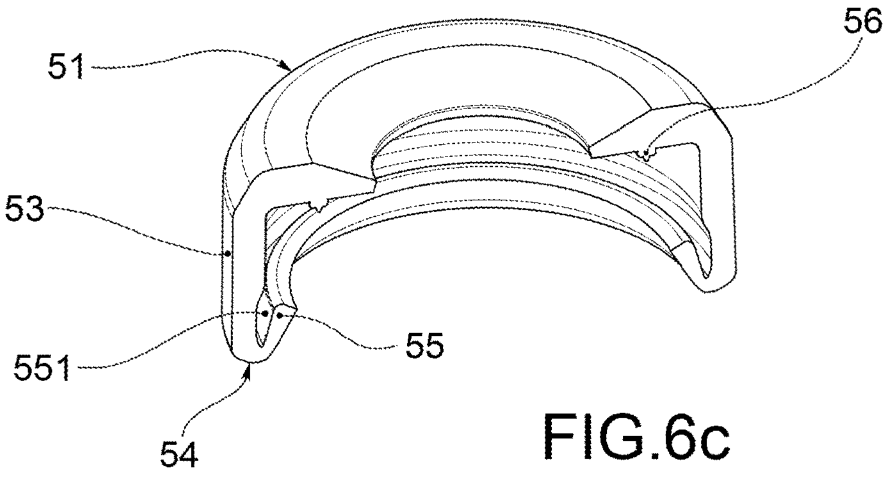

An embodiment example of an inner cage 5 is shown in FIGS. 6A to 6C. In this example, the retaining means 55 are a single, annular and continuous fold of the lower edge 54 of the skirt 53. In such solution, the fold is obtained by folding the lower edge 54 towards the inside of the skirt 53.

Figure 7A:
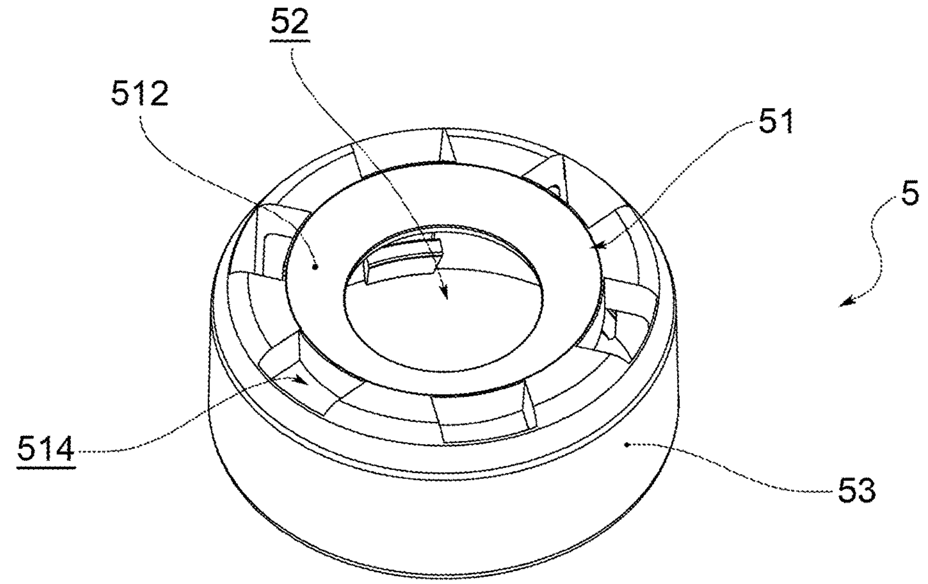
FIGS. 7A, 7B and 7C show an axonometric view from above, one from below and one in section, respectively, of a component of the closure device according to the present invention, in particular of an inner cage, in a further embodiment example.
Figure 7B:
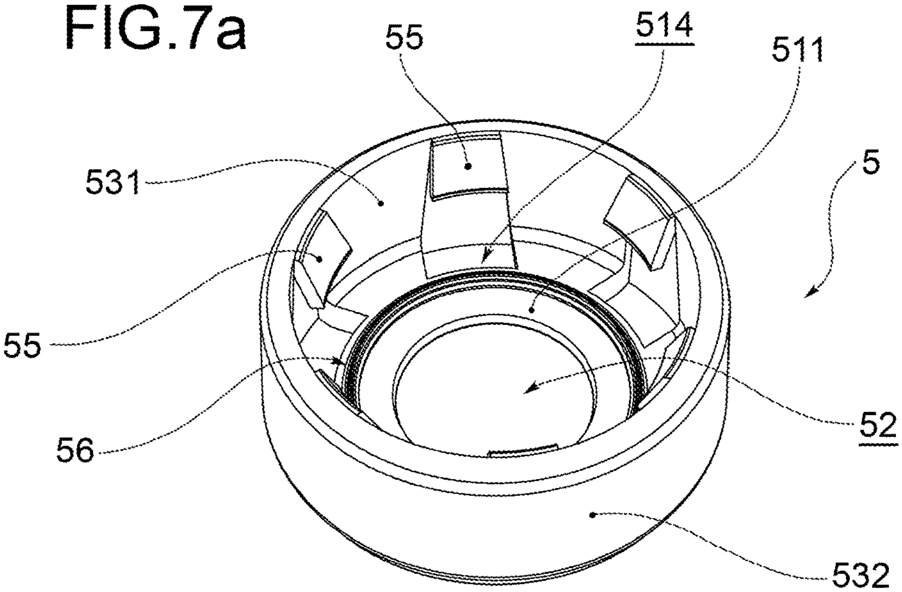
Figure 7C:
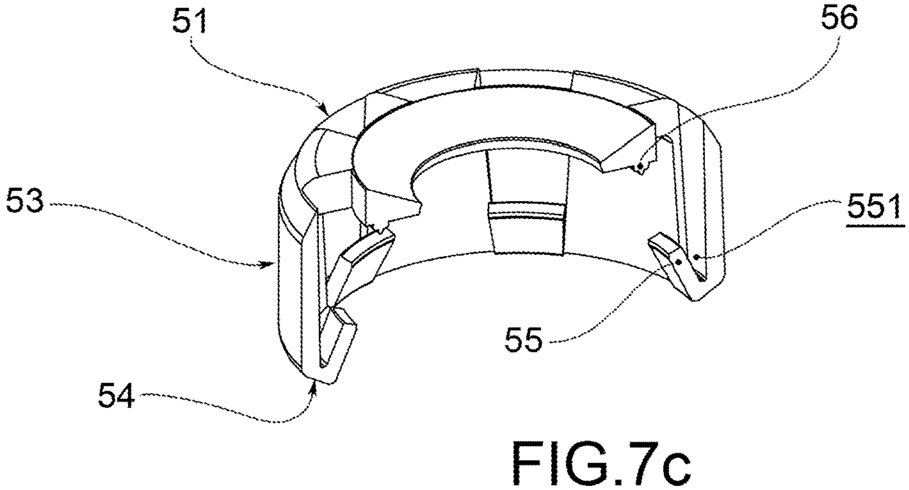

A further embodiment example of an inner cage 5 is shown in FIGS. 7A to 7C. In this example, the retaining means 55 are a plurality of folds arranged uniformly on the lower edge 54 of the skirt 53. In such solution, the folds are obtained by molding. To facilitate the extraction of the mold inserts and the entire molding step, the inner cage 5 has, for each fold, an upper access window 514 at the head 51.

Preferably, the inner cage 5 is provided with thrust means 56 of the sealing element 3, arranged below the head 51 and shown in FIGS. 10A to 11C.

Preferably, the thrust means 56 comprise at least one continuous annular protrusion 561 at the inner head surface 511. The thrust means 56 are shaped to provide a compensation mechanism for the coupling tolerances between the sealing element 3, the inner cage 5 and the ridge 22 of the neck 21 of the bottle 2. In fact, the rubber sealing element 3 and the glass ridge 22 are elements characterized by high variations in the dimensional tolerances that the inner cage 5 should compensate for to ensure the correct pulling force below the ridge 22 against any tampering. In the case of minimum tolerances of the rubber and the glass, in fact, the pull may be insufficient to guarantee the correct tightening on the bottle 2, and on the contrary in the case of maximum tolerances of the rubber and the glass, the pull may be too high so as to prevent the tightening on the bottle 2.

Figure 10B:
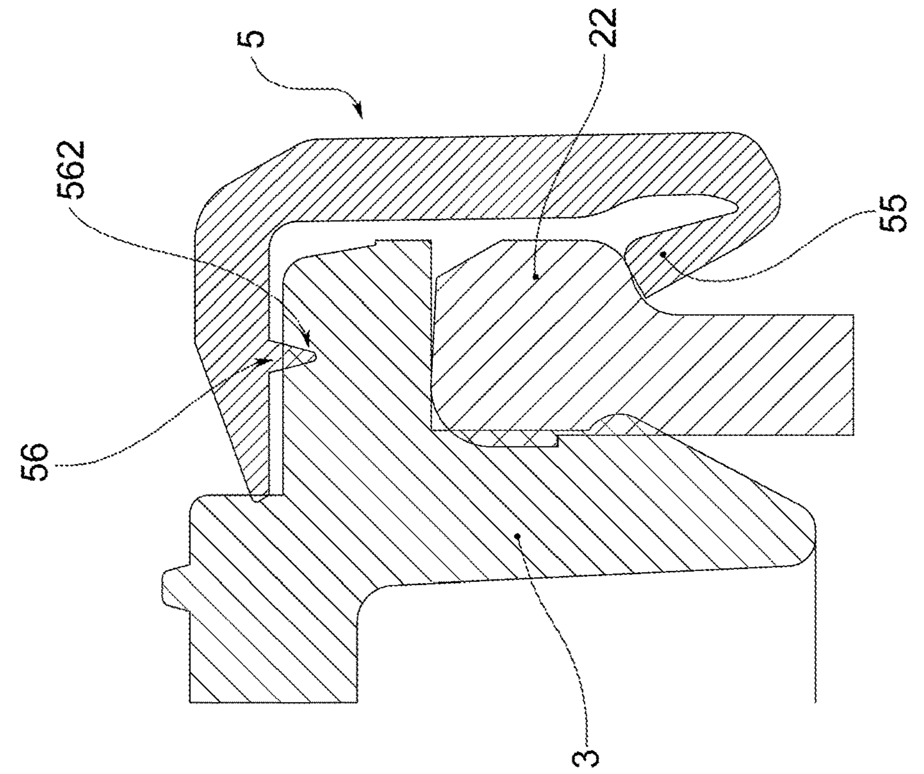
FIGS. 10A and 10B show the operation of an adaptation mechanism for compensating for different heights of the glass bottles in the case of simultaneous filling, in an embodiment example, in the case of minimum height to be compensated and maximum height to be compensated, respectively.
Figure 10A:
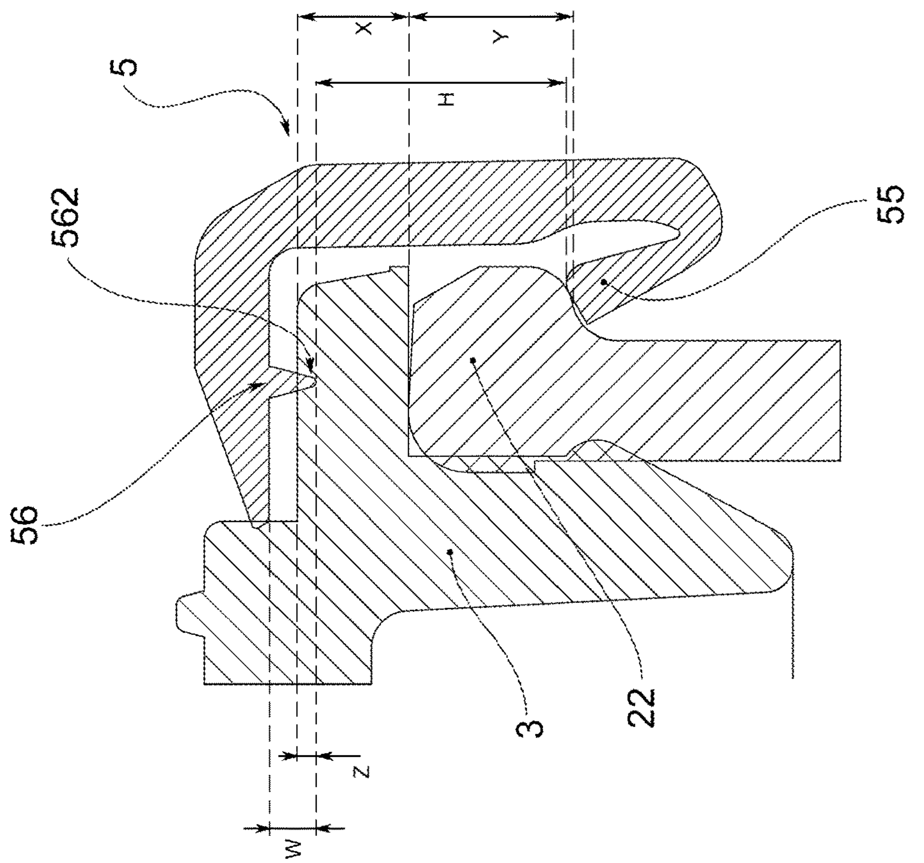

With reference to FIG. 10A, the following dimensional features of the elements involved in the tightening on the bottle neck have been indicated:

X: maximum height of the cap head 33 of the sealing element 3;

Y: maximum height of the ridge 22 of the bottle neck 2;

H: maximum height of the gripping area of the inner cage 5, defined between the end of the thrust means 56 and the end of the retaining means 55; in order for the pull exerted by the inner cage 5 to be effective, the following condition must be satisfied:

$$H<(X+Y)$$

Z: minimum pulling height defined as:

$$Z=(X+Y)-H$$

±a: tolerance of the measurement X

±b: tolerance of the measurement Y

±c: tolerance of the measurement H

W: height of the thrust means 56; in order for the pull exerted by the inner cage 5 to be effective, the following condition must be satisfied:

$$W\geq Z+a+b+c$$

It should be noted that the technical solution of the thrust means 56 having a certain height W, and the related condition to be satisfied above, is independent of the presence or absence of the outer cap 6, of specific features of the sealing element 3, such as for example the elevation 34, or of the inner cage 5, as the specific shape of the thrust means 56. Therefore, such technical solution may also be applied to other types of closure devices and containers.

Figure 11A:
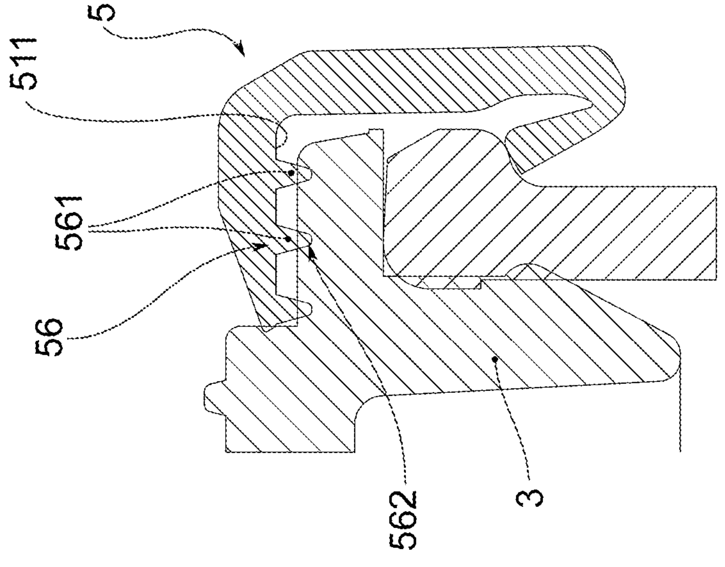
FIGS. 11A to 11C show further embodiment examples of the adaptation mechanism.
Figure 11B:
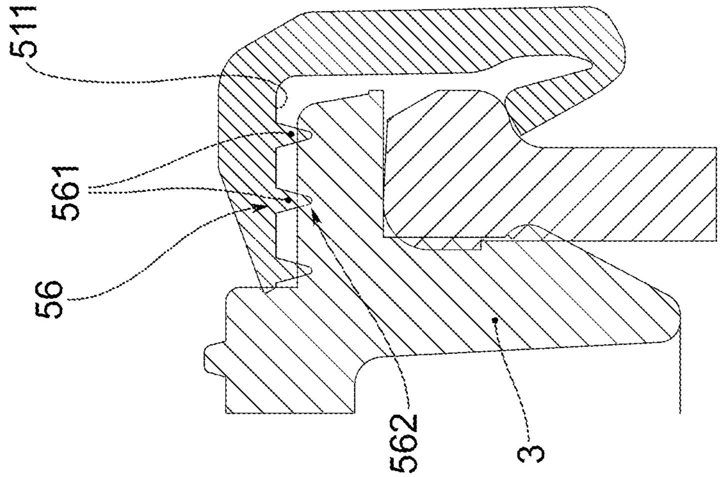

In an embodiment example, shown in FIGS. 11A and 11B, the thrust means 56 have a triangular profile ending in a tip 562 suitable for sinking at least partially into the sealing element 3. In such embodiment examples, the thrust means 56 comprise a plurality of shaped protrusions.

Figure 11C:
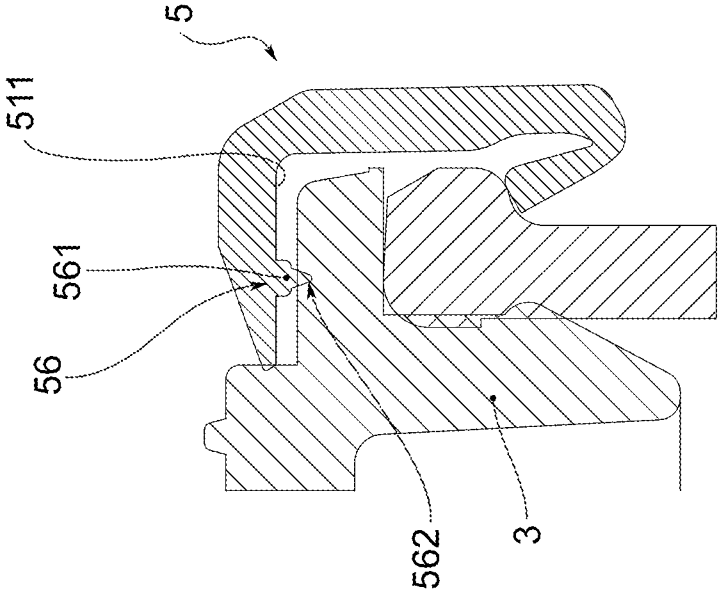

In a further embodiment example, shown in FIG. 11C, the thrust means 56 have a stepped profile, with a larger section above which a reduced section tip 562 protrudes.

The thrust means 56 of the inner cage 5 will be able to exert, through the tip 562, a minimum thrust on the sealing element 3 even in the case of minimum tolerances of the glass and the rubber, as in FIG. 10A. At the same time, the maximum thrust exerted towards the sealing element 3 in the case of maximum tolerances of the glass and the rubber, shown in FIG. 10B, will not be excessive since the tip 562, having a very small section, will sink more into the sealing element 3. Advantageously, therefore, also by virtue of the thrust means 56 of the inner cage 5, once the snap coupling on the neck 21 of the bottle 2 has been obtained, no further fixing or retaining element will be required to keep the sealing element 3 firmly in the closed sealing position of the mouth 24 of the bottle 2 even if the outer cap 6 is completely removed by tearing.

Figure 12:
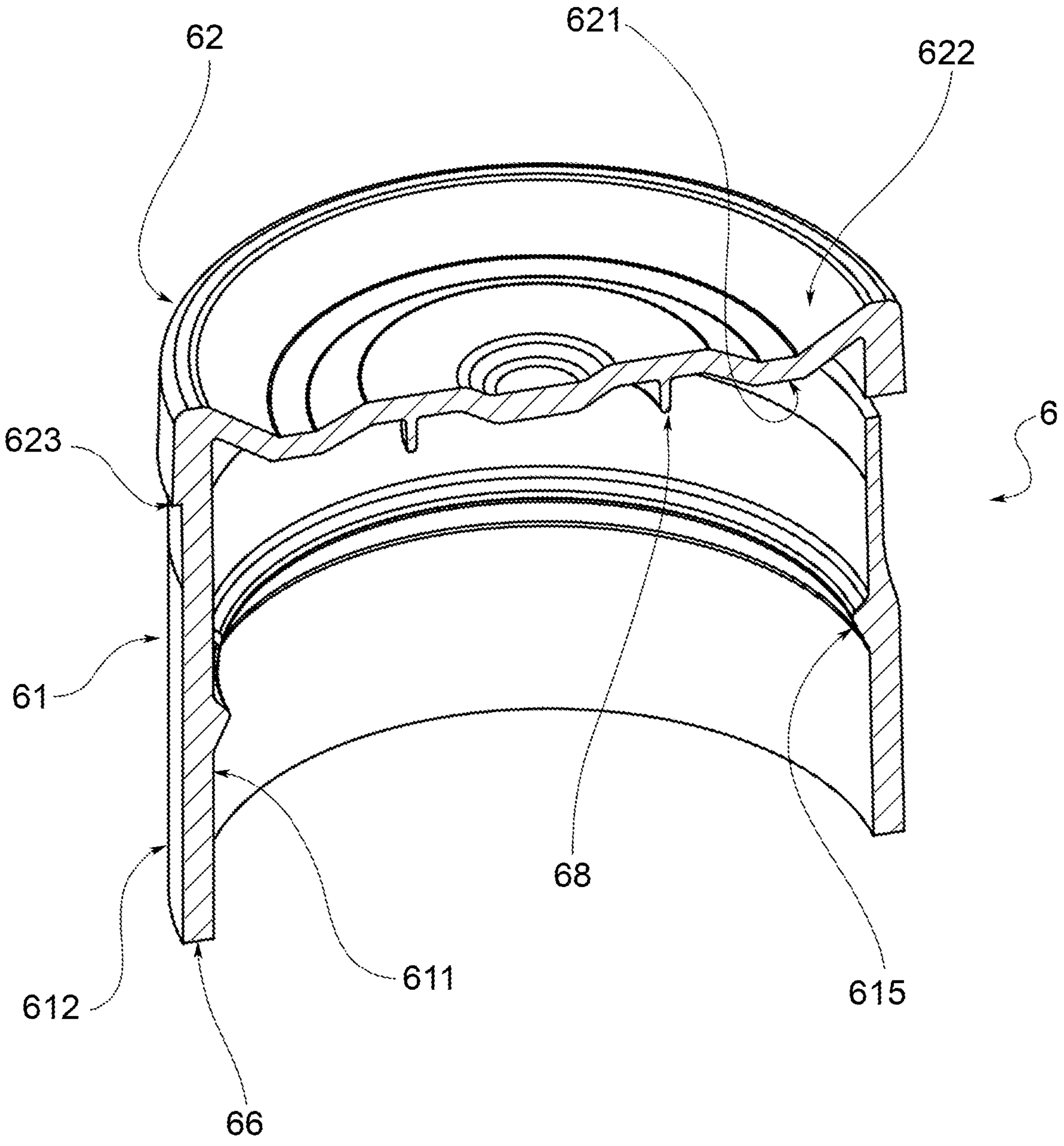
FIG. 12 shows a sectional view of a component of the closure device according to the present invention, and in particular an outer cap.

FIG. 12 shows the outer cap 6 of the safety cap 4 according to the present invention.

The outer cap 6 is provided with tear-open means by means of which it may be opened to expose the sealing element 3.

The outer cap 6 is formed by a band 61, preferably cylindrical, closed at the top by a cover 62, preferably disc-shaped.

Figure 1:
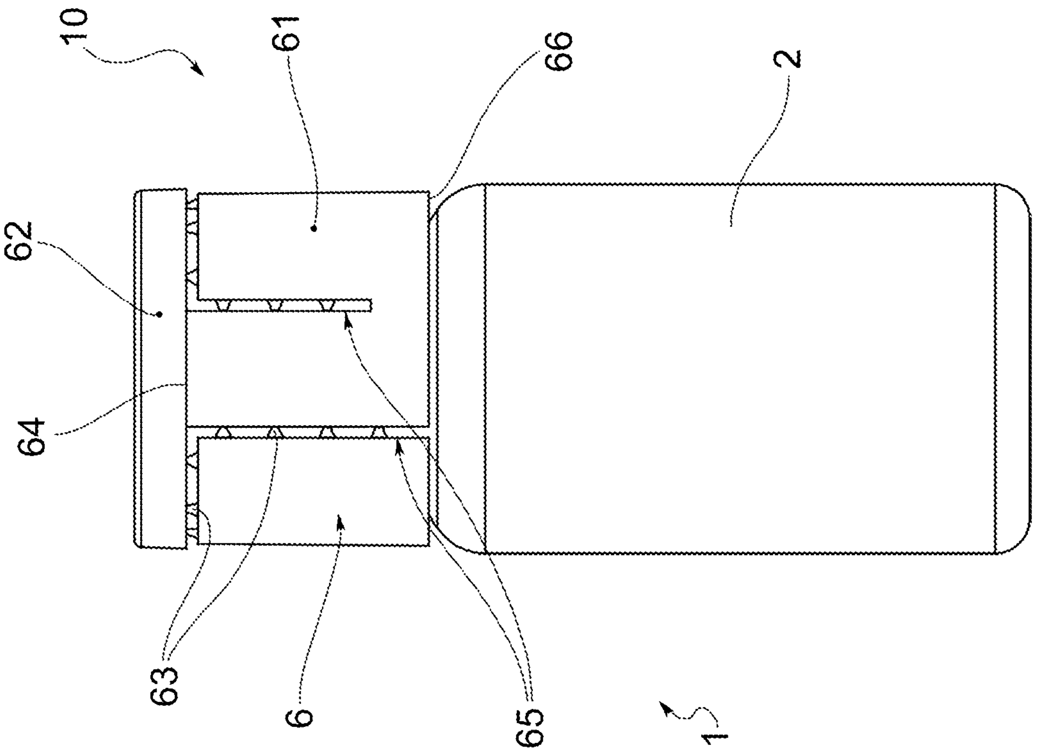
FIG. 1 shows a rear view of a container for parenterally administrable drugs provided with a partially tear-off plastic closure device according to the present invention, in configuration.

Preferably, the band 61 is elongated, i.e. it extends to cover the entire neck 21 of the bottle 2, as seen in FIG. 1. This solution considerably reduces the risks of tampering as it is more difficult to access underneath the safety cap 4 to try to tamper with it.

The cover 62 is connected to the band 61 by weakenings 63 at an outer perimeter 623 of the cover. Such weakenings 63 are suitable for being torn apart to separate the cover 62 from the band 61, opening the outer cap 6 at the top to allow access to the sealing element 3.

The weakenings 63 are a plurality of uniformly distributed thin bridges, as shown in FIG. 1, or necking lines of the material, or pre-cuts, or grooves.

In an embodiment example, the cover 62 is completely separable from the band 61.

Figure 3B:
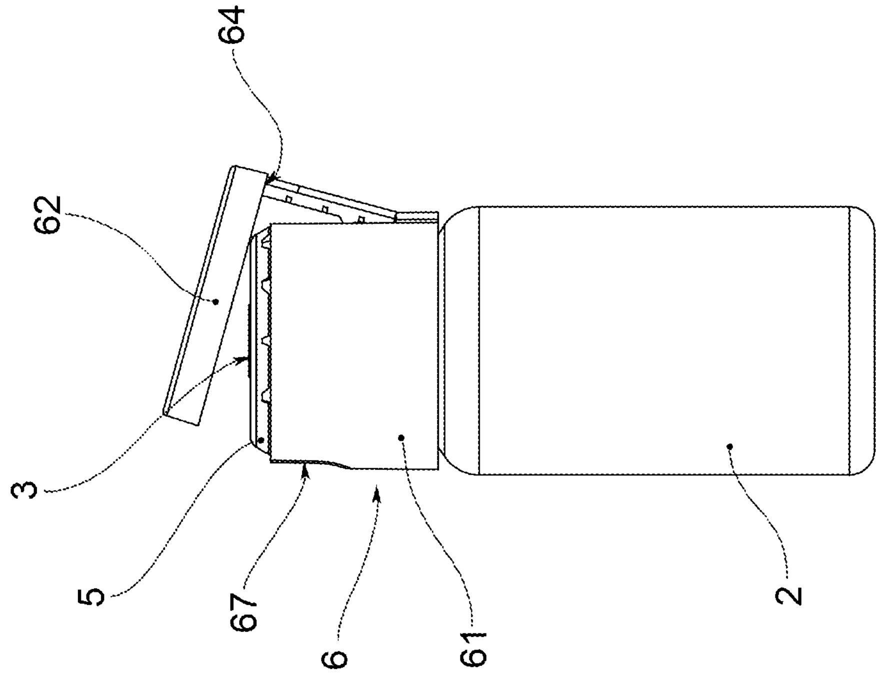
FIGS. 3A and 3B show the opening steps of the closure device according to the present invention, in particular the tear-off removal of the outer cap of the cap.
Figure 3A:
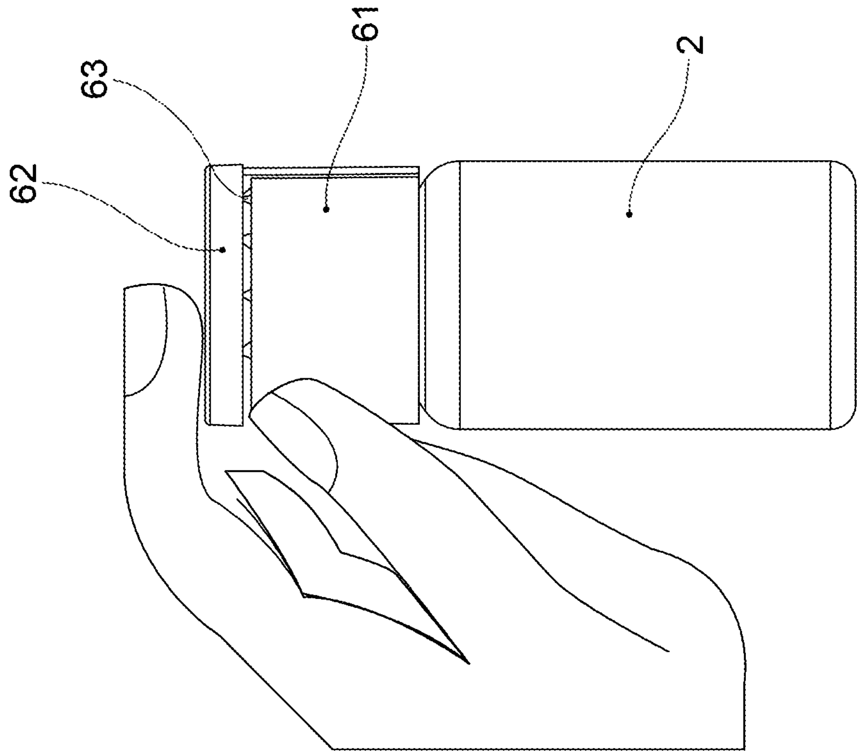

In a further embodiment example, the cover 62 is partially separable from the band 61, as seen in FIG. 3B. In this example, the cover 62 remains connected to the band 61 by means of a connecting portion 64, which may not be torn apart, placed at the outer perimeter 623 of the cover itself.

Preferably, also the band 61 has at least one line 65 of weakenings 63. Such line 65 may be whole and extend for the entire length of the band 61, or interrupted and therefore interrupt before the lower edge 66.

Preferably, the band 61 has an entire line 65 of weakenings 63 which allows the longitudinal opening of the band itself, and a parallel interrupted line 65 of weakenings 63 which allows the removal of the entire outer cap 6 at once, that is to say without the formation of separate pieces.

Preferably, the at least one line 65 of weakening 63 extends from one end of the connecting portion 64 between the cover 62 and the band 61.

Figure 4A:
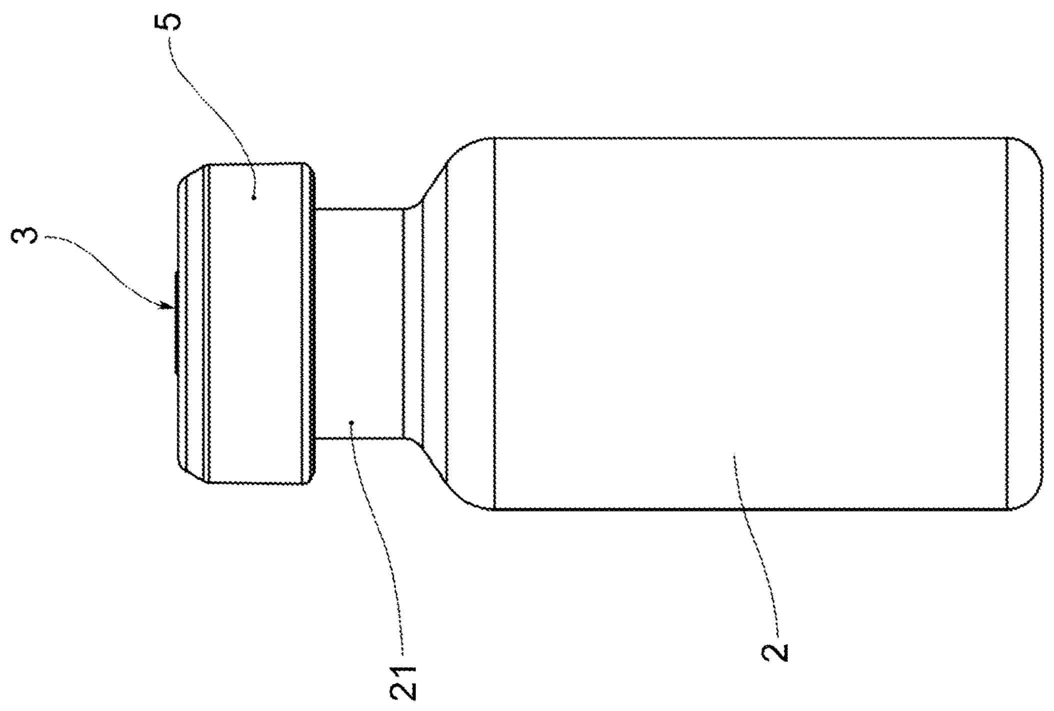
FIGS. 4A and 4B show a front view and a sectional view, respectively, of the closure device according to the present invention, after the outer cap of the cap has been completely removed.
Figure 4B:
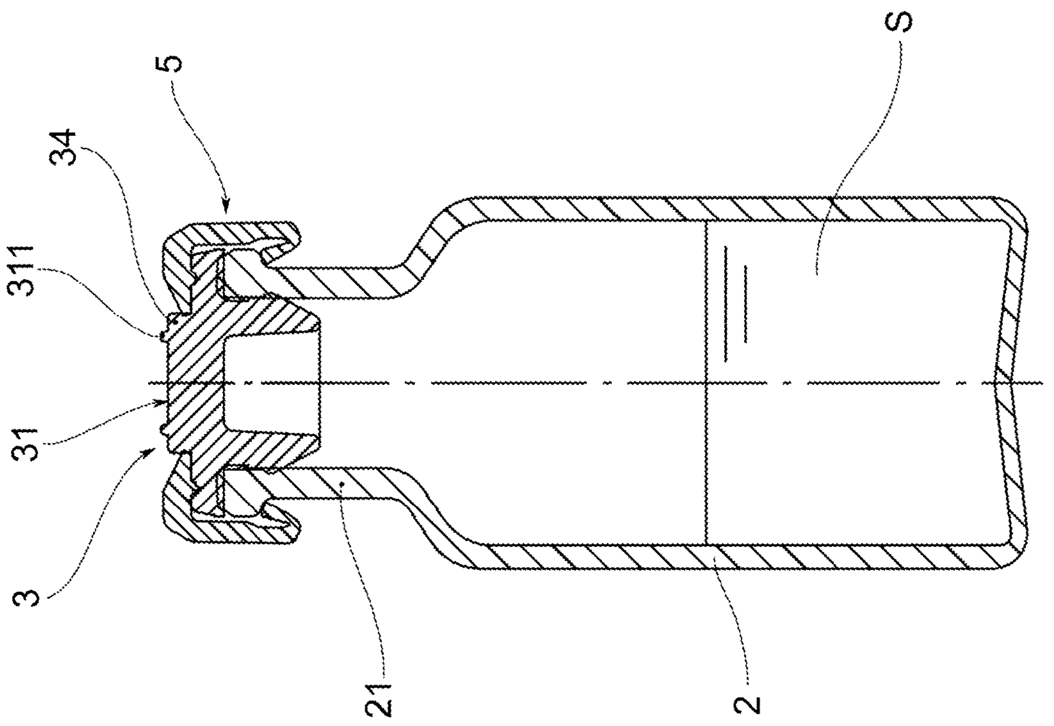

The presence of the weakenings 63 also on the band 61 facilitates the complete removal of the outer cap 6 of the safety cap 4 from the container. Advantageously, by virtue of a completely removable outer cap 6, even in the presence of a deliberately elongated band 61 covering the entire neck 21 of the bottle 2, it is possible to maintain full visibility of the neck itself, as may be seen in FIG. 4*a*, useful when the bottle 2 is turned upside down during the final withdrawal of the pharmacological solution by means of a syringe and the residual solution is collected precisely at said neck.

Preferably, the outer cap 6 is also provided, at the band 61, with a gripping depression 67 to facilitate gripping and removal of the cover 62. The user may thus more easily insert a nail under the outer perimeter 623 of the cover 62 and lift it, causing the tearing of the weakenings 63.

The cover 62 of the outer cap 6 is provided with an outer cover surface 622 and an inner cover surface 621.

Preferably, the outer cap 6 is provided with means 68 for protecting the sealing element 3, arranged under the cover 62. Preferably, the protection means 68 are a protrusion 681, preferably annular and continuous, at the inner covering surface 621. Such protrusion 681 delimits a chamber 682, visible in FIG. 13. When the closing device 10 is assembled, the protection means 68 are arranged in such a way that the protrusion 681 abuts against the sealing element 3 about the pierceable portion 31, which is therefore arranged inside the chamber 682. Therefore, the inner covering surface 621 of the outer cap 6 is always raised with respect to the pierceable portion 31 of the sealing element 3 to avoid the contamination thereof.

Figure 13:
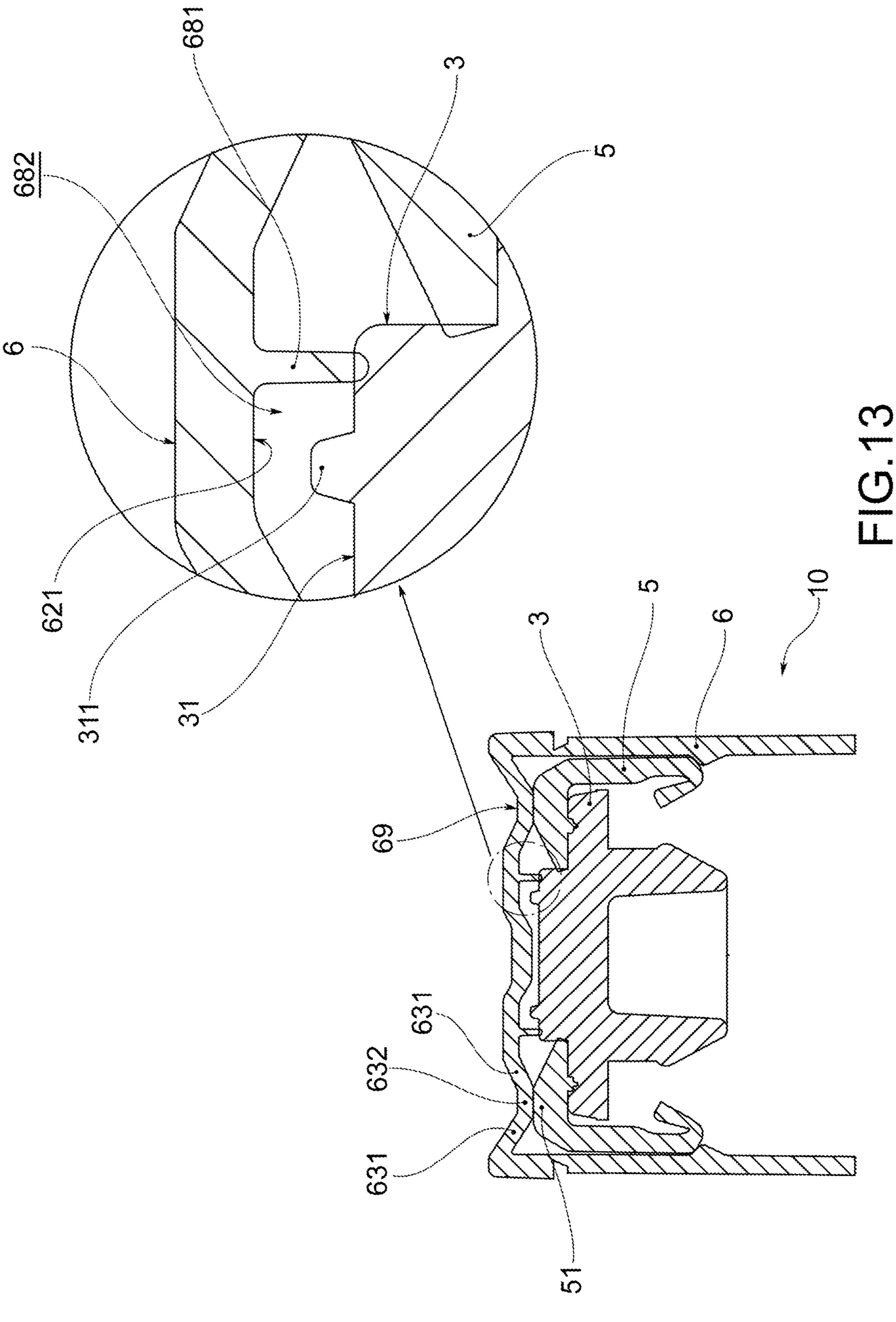
FIG. 13 shows a detail of the closure device according to the present invention, and in particular a further adaptation mechanism to compensate for different heights of the glass bottles in the case of simultaneous filling, in an embodiment example.
Figures 14A, 14B, 14C:
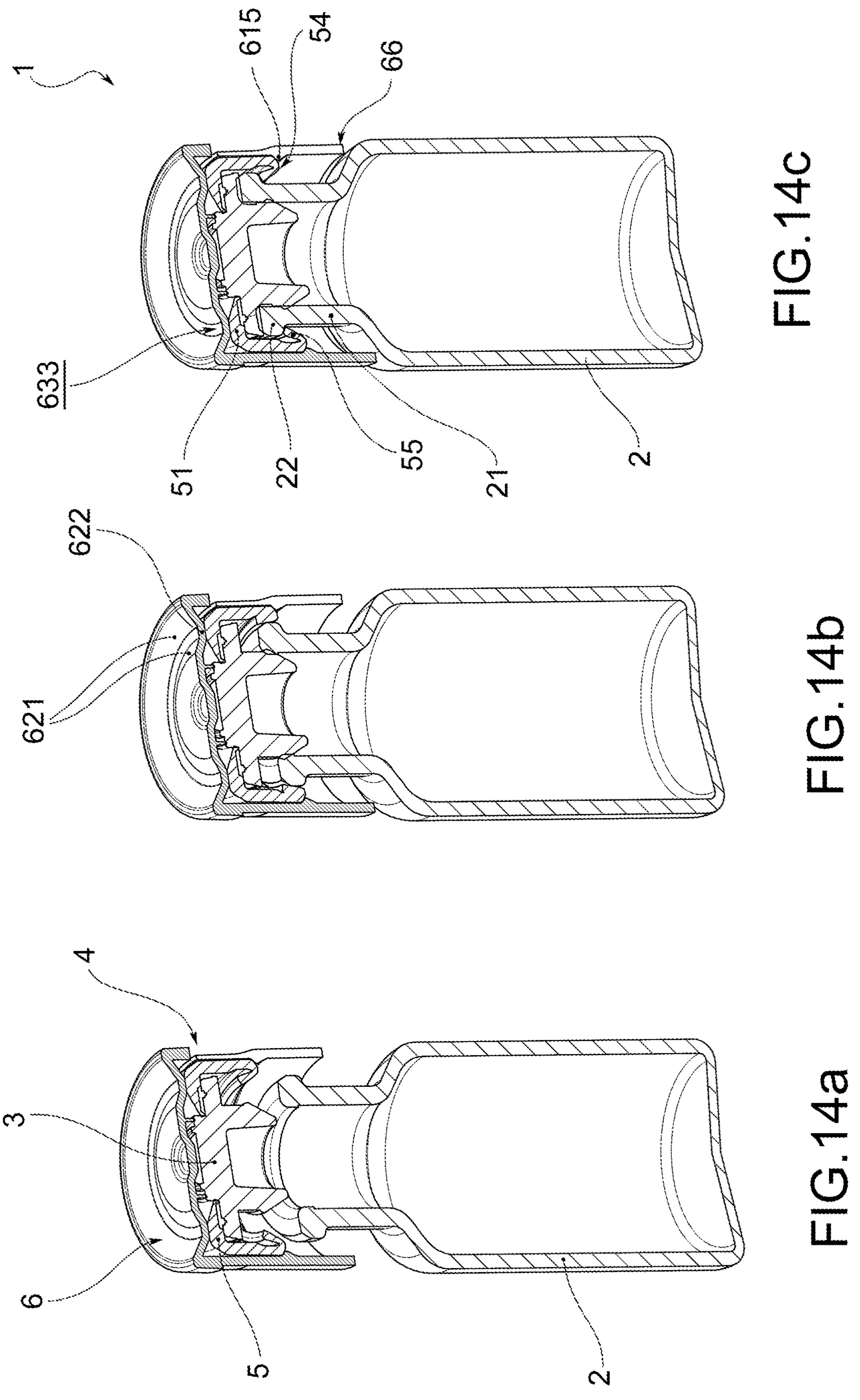
FIGS. 14A to 14C further show the assembly steps of the closure device according to the present invention on the relative container.

Preferably, the outer cap 6 is provided with cushioning means 69 arranged at the cover 62, and shown in FIG. 13. Preferably, the cushioning means 69 form a linear spring and are obtained by folds in the cover 62. In particular, the cover 62 comprises a pair of inclined walls 631, facing each other, between which a bottom wall 632 is arranged, so as to provide an annular depression 633. As may be seen in FIG. 13, when the closure device 10 is assembled, the bottom wall 632 abuts against the head 51 of the inner cage 5. Advantageously, the cushioning means 69 provide a mechanism for adapting the closure device 10 to compensate for different heights of the bottle 2 in the case of simultaneous filling.

As shown in FIG. 8B, the band 61 of the outer cap 6 has a height adapted to completely cover the inner cage 5 and the entire neck 21 of the bottle 2.

The band 61 of the outer cap 6 is provided with an outer band surface 612 and an inner band surface 611.

The outer cap 6 is fixed to the bottle 2 by means of the interposition of the inner cage 5. The outer cap 6 of the safety cap 4 is in fact snap-engaged under the lower edge 54 of the inner cage 5 by means of coupling means 615.

The coupling means 615 are made in one piece with the band.

The coupling means 615 are at least one relief protruding inside the band 61. Preferably, the coupling means 615 are in the form of a continuous annular relief, protruding from the inner surface of the band 611.

Preferably, the coupling means 615 are arranged more internally, that is to say upstream, with respect to the lower edge 66 of the band 61.

Figure 9A:
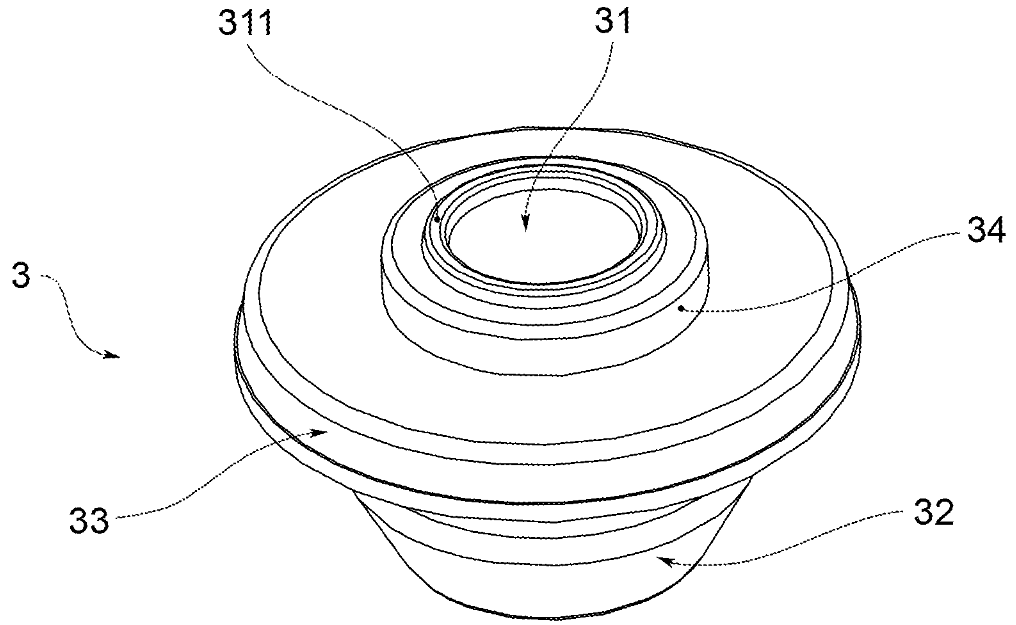
FIGS. 9A and 9B show a component of the closure device according to the present invention, and in particular a sealing element, in two embodiment variants.
Figure 9B:
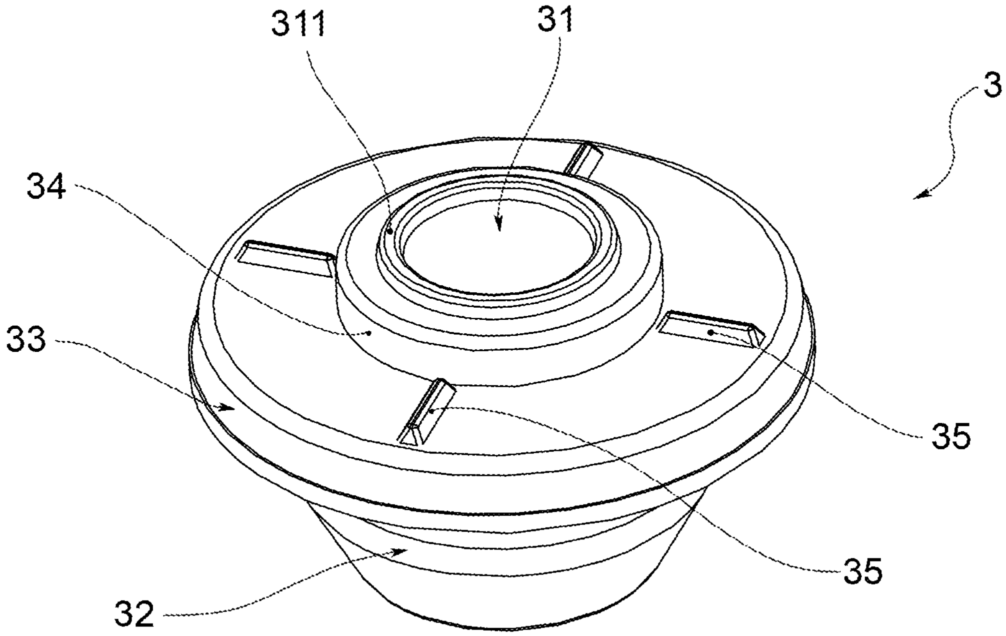

The sealing element 3, shown in two embodiment variants in FIGS. 9A and 9B, is a rubber cap having a cap head 33, preferably disc-shaped, below which the cap body 32, preferably cylindrical, extends.

The cap body 32 is intended to fit inside the neck 21 of the bottle 2, while the cap head is intended to rest against the edge 23 to close the mouth 24 of the bottle itself.

The sealing element 3 is provided with a pierceable disc-shaped portion 31, arranged centrally to the cap head 33 and defined inside an annular edge 311.

Figure 4D:
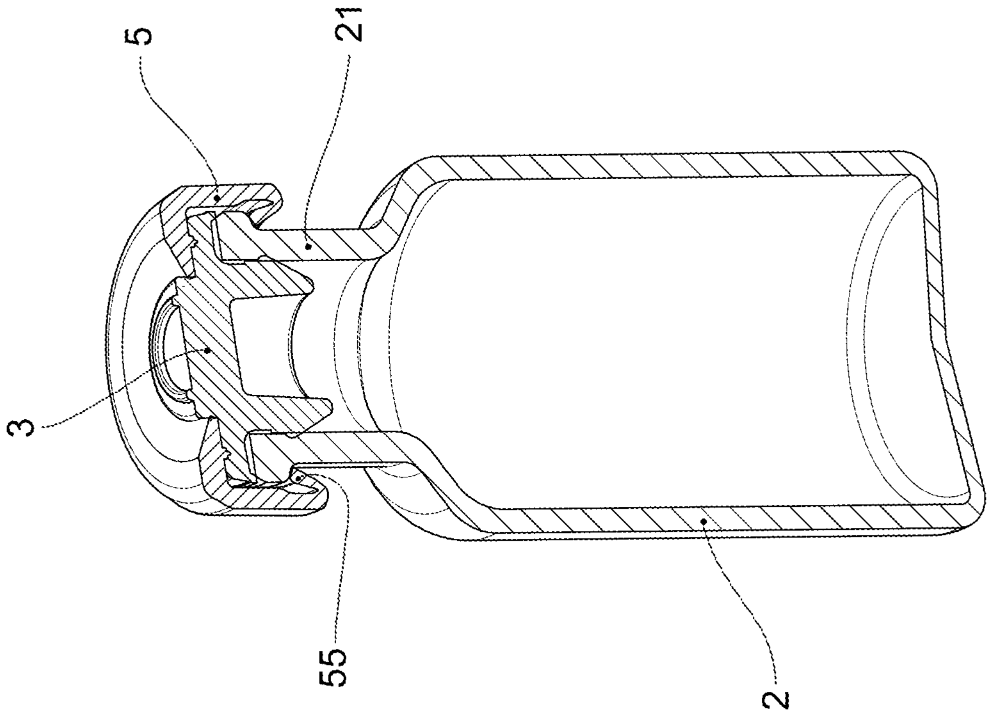
FIGS. 4C and 4D show an axonometric view and an axonometric sectional view, respectively, of the closure device according to the present invention, after the outer cap of the cap has been completely removed.
Figure 4C:
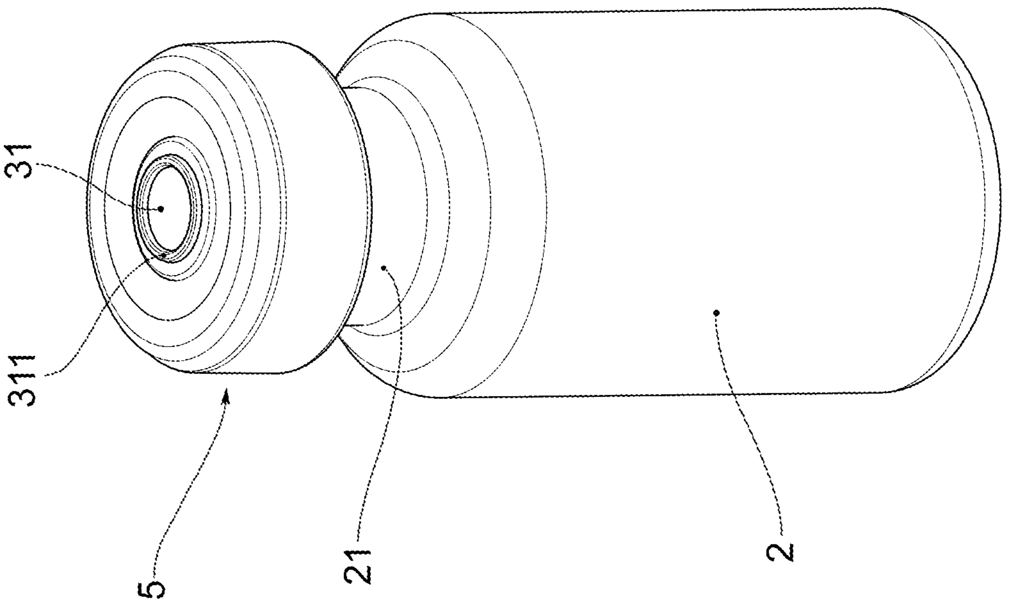

Preferably, the pierceable portion 31 is made on a disc-like elevation 34 of the cap head 33. That is to say that the cap head 33 defines a head plane, and that the pierceable portion 31 is arranged on a raised plane with respect to the head plane and defined by the elevation 34. As may be seen in FIGS. 4C and 4D, when the closing device 10 is assembled, the elevation 34 is inserted and retained inside the central opening 52 of the head 51 of the inner cage 5. Advantageously, in this way the sealing element 3 is engaged with the inner cage 5 and this facilitates the handling thereof during the assembly step of the closure device 10. Advantageously, the elevation 34 allows the pierceable portion 31 to be positioned higher, which is more easily accessible and disinfectable when using the container 1.

Preferably, the pierceable portion 31 is arranged flush with the head 51 of the inner cage 5. Preferably, the annular edge 311 which defines the pierceable portion 31 projects above the head 51 of the inner cage 5.

In an embodiment, shown in FIG. 9B, the sealing element 3 is provided with a plurality of thrust reliefs 35 arranged radially on the cap head 33, uniformly distributed about the pierceable portion 31. For example, the sealing element 3 is provided with four thrust reliefs 35. The thrust reliefs 35 of the sealing element 3 are adapted to collaborate with the thrust means 56 of the inner cage 5.

The present invention also relates to a container 1 for parenterally administrable pharmaceutical products comprising a bottle 2 closed by a closing device 10 as described above, i.e. made of a sealing element 3, for example made of rubber, and a safety cap 4, for example made of plastic, partially tear-off and adapted to guarantee the authenticity of the container, highlighting any tampering.

Advantageously, a container 1 thus made is provided with a particularly effective anti-tampering system, while maintaining reduced overall dimensions. As may be seen in FIG. 1, in fact, the closing device 10 according to the present invention has an outer diameter which is smaller than or at most corresponding to the outer diameter of the bottle 2. Even more advantageously, in the case of a closing device 10 with an outer diameter corresponding to the outer diameter of the bottle 2, the container 1 has an overall cylindrical shape which considerably facilitates the handling thereof, especially in the case of simultaneous filling of several containers in completely automated systems.

As far as the materials are concerned, the technical solutions described above are applied to plastic closing devices 10, to glass or plastic bottles 2, to sealing elements 3 in thermosetting rubber or thermoplastic rubber.

Innovatively, a plastic closure device for parenterally administrable drugs, partially tear-off, and a relative container according to the present invention allow all the intended objects as described above to be achieved in a particularly effective manner.

Advantageously, a closure device according to the present invention not only guarantees the authenticity of the container, but is also capable of guaranteeing the tightness of the container even in the event of tampering attempts.

In summary, a closure device according to the present invention has the following innovative and advantageous features:

1. offers a complete "tamper evident" and inviolability system;
2. is provided with an upper flip-off opening integrated with a complete opening of the "tamper evident" band by means of a tear;
3. provides a spring system to absorb extra forces during the fitting step;
4. is provided with a protection ring from external agents (e.g. dust) of the piercing area of the rubber closure;
5. provides a snap-fit coupling system of the inner cage 5 to the neck of the bottle 2 by means of retaining means 55 in the form of a turned-up lip (version of FIG. 6A);
6. provides a snap-fit coupling system of the inner cage 5 to the neck of the bottle 2 by means of retaining means 55 made by molding (version 7A);
7. has a low fitting force by virtue of the coupling system which provides a bearing space for the free deformation of the retaining means 55;
8. allows the rubber sealing element 3 to be supported inside the inner cage 5 even before fitting onto the bottle;
9. allows the maximum overall diameter of the closure device to be kept lower than the diameter of the bottle;
10. provides an exposure system for the sealing element 3 which facilitates cleaning after opening the flip-off, by virtue of the raised central position;
11. requires an extremely reduced number of components, only two components in addition to the rubber sealing element 3;
12. once the outer cap 6 has been removed, the inner cage 5 has a size comparable to that of traditional aluminum ferrules, thus allowing full visibility of the neck and compatibility with traditional transfer devices.

It is clear that those skilled in the art may make changes to the closure device and to the container described above, all falling within the scope of protection as defined in the following claims.

The invention claimed is:

1. A plastic closure device for a container for parenteral pharmaceutical products comprising a bottle provided with a neck, said plastic closure device comprising a removable outer cap formed by a cylindrical band closed at the top by a cover, said removable outer cap being provided with tearable weakenings to allow removal by tearing of the removable outer cap, and coupling means protruding inside the cylindrical band, wherein the plastic closure device further comprises an inner cage provided with a head having a central opening, wherein a skirt extends below the central opening, the skirt ending in a lower edge at which retaining means are provided for permanently engaging the neck of the bottle by snapping, and wherein the removable outer cap is engaged by snapping below the lower edge of the inner cage by the coupling means.

2. The plastic closure device of claim 1, wherein said retaining means are at least one hook-shaped protrusion facing towards inside of the inner cage, adapted to bend during assembly on the neck of the bottle and to stick below the neck in case of removal attempts.

3. The plastic closure device of claim 2, wherein the retaining means are provided with a bearing space defined between the at least one hook-shaped protrusion and a skirt inner surface.

4. The plastic closure device of claim 1, wherein said retaining means are connected to the skirt by the lower edge, the lower edge having a curvilinear profile.

5. The plastic closure device of claim 1, wherein the retaining means are a fold of the lower edge of the skirt.

6. The plastic closure device of claim 1, wherein the retaining means are a plurality of folds uniformly distributed along the lower edge of the skirt.

7. The plastic closure device of claim 6, wherein said inner cage is provided, at the head, with an upper access window above each fold.

8. The plastic closure device of claim 1, wherein the inner cage is provided, at an inner head surface, with thrust means for a rubber sealing element, said thrust means being at least one protrusion with a tip.

9. The plastic closure device of claim 1, wherein said cover is connected to the cylindrical band by the tearable weakenings and/or said cylindrical band is also provided with tearable weakenings.

10. The plastic closure device of claim 9, wherein said cover is also connected to the cylindrical band by a non-tearable connection portion.

11. The plastic closure device of claim 1, wherein the removable outer cap is provided with protection means for protecting a rubber sealing element, and wherein the protection means are an annular protrusion on an inner surface of the cover.

12. The plastic closure device of claim 1, wherein the removable outer cap is provided with cushioning means, arranged at the cover, the cushioning means forming a linear spring and being obtained by folds in the cover.

13. The plastic closure device of claim 1, further comprising a rubber sealing element housed inside the inner cage so that, after removal of the removable outer cap, a pierceable portion of said rubber sealing element is accessible from outside through the central opening of the inner cage.

14. The plastic closure device of claim 13, wherein the rubber sealing element comprises a cap head that defines a head plane, and wherein said pierceable portion is arranged on a raised plane relative to the head plane and defined by an elevation.

15. The plastic closure device of claim 14, wherein said rubber sealing element is retained within the inner cage by frictional engagement of the elevation in the central opening of the head.

16. A container for parenteral pharmaceutical products, the container comprising:

a bottle provided with a neck with a radially projecting ridge; and a plastic closure device comprising a removable outer cap formed by a cylindrical band closed at the top by a cover, said removable outer cap being provided with tearable weakenings to allow removal by tearing of the removable outer cap, and coupling means protruding inside the cylindrical band, wherein the plastic closure device comprises an inner cage provided with a head having a central opening, wherein a skirt extends below the central opening, the skirt ending in a lower edge at which retaining means are provided for permanently engaging the neck of the bottle by snapping, wherein the removable outer cap is engaged by snapping below the lower edge of the inner cage by the coupling means, and wherein the inner cage is provided, at an inner head surface, with thrust means for a rubber sealing element, the thrust means being at least one protrusion, the plastic closure device further comprising a rubber sealing element, wherein the inner cage is permanently fixed by snapping below the radially projecting ridge of the neck of the bottle also after removal by tearing of the removable outer cap.

17. The container of claim 16, wherein the cylindrical band of the removable outer cap entirely covers the neck of the bottle and ends at a shoulder of the bottle.

18. The container of claim 16, wherein the lower edge of the inner cage ends just below the radially projecting ridge to allow visibility of the neck of the bottle.

19. The container of claim 16, wherein the following dimensional features are defined:

X: maximum height of a cap head of the rubber sealing element;

Y: maximum height of the radially projecting ridge of the neck of the bottle;

H: maximum height of a gripping area of the inner cage, defined between one end of the thrust means and one end of the retaining means;

Z: minimum pulling height defined as $$Z=(X+Y)-H$$

±a: tolerance of measurement X;

±b: tolerance of measurement Y;

±c: tolerance of measurement H;

W: height of the thrust means defined as $$W \geq Z+a+b+c.$$

* * * * *